Aug. 17, 1954 A. THOMAS 2,686,849

ELECTRICAL SIGNALING SYSTEM

Filed May 20, 1952

Inventor
Arthur Thomas
by Dezso Steinberg
attorney

Patented Aug. 17, 1954 2,686,849

UNITED STATES PATENT OFFICE 2,686,849

ELECTRICAL SIGNALING SYSTEM

Arthur Thomas, Taplow, England, assignor to British Telecommunications Research Limited, Taplow, England, a British company Application May 20, 1952, Serial No. 288,785

Claims priority, application Great Britain May 23, 1951

16 Claims. (Cl. 179—175.3)

The present invention relates to electrical signalling systems and is particularly concerned with systems for telecommunication or like purposes employing equipment capable of dealing with a very wide frequency spectrum, i. e. so-called wide-band systems.

As the number of circuits operated over a single wide-band system is increased with a consequent increase in the number of line amplifiers, some of which may be sited in relatively inaccessible locations, it becomes increasingly important to have available some means of locating a faulty amplifier from an attended station at one end of a chain of repeater stations, and also of frequently checking the performance of the line equipment in order to detect incipient faults before they cause a complete system failure.

The chief object of the invention is to provide simple arrangements whereby tests of this nature may be made from a remote point, normally one or both ends of a chain of amplifiers.

According to the invention, the amplifiers at each station for the two directions of working are adapted to have associated with them filter circuits of such parameters that when tones of particular frequencies are applied to the line for testing purposes the characteristics of the tone received back will furnish the required information as to the condition of the different amplifiers and also of the intervening cable stations.

With the usual form of line amplifier having a large amount of negative feed-back, the most sensitive indicated of deterioration in performance is obtained by a measurement of the amount of harmonic produced by a known input level of fundamental tone or of the amount of intermodulation produced from two input tones of differing frequencies. Such a test coupled with a measurement of the gain of the amplifier gives a very complete picture of its performance quality.

In order to be able to make such measurements of gain and distortion from a remote measuring point, means must be provided at this point for transmitting test tones to the selected amplifier under test and for receiving from this amplifier suitable signals to enable its gain and distortion performance to be measured while discriminating against all signals returned from the remaining amplifiers. A further important consideration is that the means adopted shall not require switching contacts in the main transmission path and preferably shall not involve any switching operations at the intermediate stations.

Figure 1:
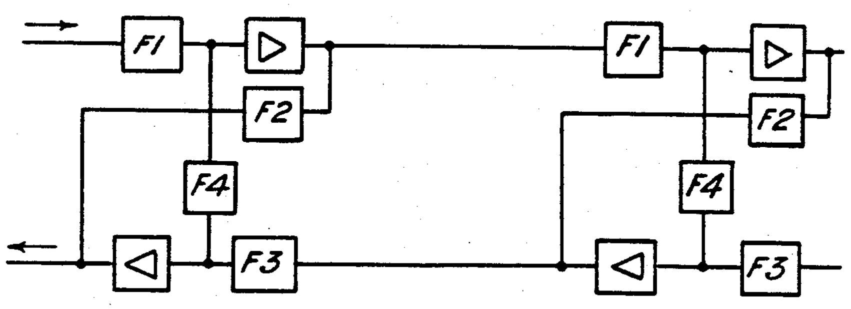
Figure 2:
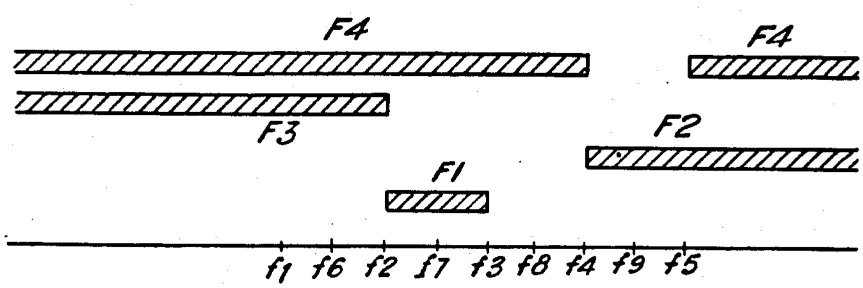
Figure 3:
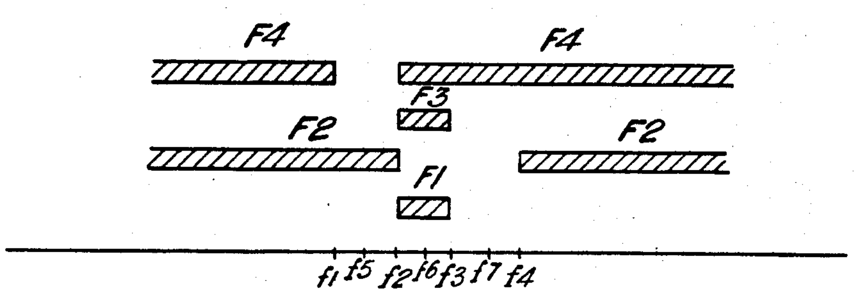

The invention will be better appreciated from the following description of possible methods of carrying it into effect which should be taken in conjunction with the accompanying drawings comprising Figs. 1–3. Fig. 1 is a block schematic diagram showing the Go and Return channels and the equipment of two repeater stations, while Figs. 2 and 3 indicate two alternative ways of arranging the frequency characteristics of the filters.

Non-linear distortion can conveniently be measured by transmitting simultaneously two tones of frequency A c./s. and B c./s. respectively from the measuring point. As these two tones traverse each amplifier of the chain, combination tones are produced the power level of which, relative to that of the fundamental tones, can be interpreted as a measure of amplifier non-linearity. Of the series of combination tones which could be employed, the second and third order difference tones of frequencies (A—B) c./s. and (2A—B) c./s. are likely to be the most useful but others such as (AB) or (2AB) or higher order combination tones could be used. The term "low order combination tones" is used in the appended claims to denote such combination tones.

It will be seen that by suitable choice of the A and B frequencies, successive tests can be made in which the A—B and 2A—B combination tones have the same frequency. If, therefore, a filter passing this frequency is connected between the outputs (or inputs) of the amplifiers for the two directions of transmission at each station as shown at F2 in Fig. 1, the combination tones will be able to return to the measuring point by way of the main transmission path for the return direction.

If the filter F2 alone was provided, then the distortion products from all the preceding amplifiers would also be returned to the measuring point via F2 and would mask the distortion produced by the amplifier under test. This is avoided by preceding each amplifier by a filter F1 which has a stop band located to suppress the distortion products from the preceding amplifiers. The filter F3 serves the same purpose as F1 for the opposite direction of transmission.

By transmitting from the measuring point a single tone having a frequency located within the pass band of F2 but outside the stop bands of F1 and F3, the loop loss of a portion of the system comprising the Go amplifier at one station, the Return amplifier at the preceding station and the section of cable between the two stations can be checked. If it is desired to locallize a fault to one particular station, a fourth filter F4 having a pass band lying within the stop band of F2 and outside the stop bands of F1 and F3 is connected between the input circuits of the two amplifiers at each station (or between the output circuits if F2 is connected between the amplifier inputs). By making measurements from both ends of the chain of unattended stations using test tones having frequencies located within the pass bands of F2 and F4 respectively a transmission fault can be located to one of the amplifiers at a particular station or to one section of cable.

In order to be able to discriminate between the distortion products received from each of the several amplifiers in the chain of unattended stations, one or both of the test tones may be pulsed so that the resulting combination tones also appear as a train of pulses. Each received pulse of combination tone can then be identified with its originating amplifier by measuring the time delay between its arrival at the measuring point and the emission of the corresponding pulse of test tone.

It will be assumed that the lower portion of the system frequency band is made permanently available for testing purposes. If this testing frequency range extends from $f_1$ to $f_5$ c./s. it can be divided into four bands, $f_1$ to $f_2$ c./s., $f_2$ to $f_3$ c./s., $f_3$ to $f_4$ c./s. and $f_4$ to $f_5$ c./s. the centre frequency of each band being $f_6$, $f_7$, $f_8$ and $f_9$ respectively as indicated in Fig. 2. The combination tones produced in the Go amplifiers are arranged to have a frequency $f_7$, those produced in the Return amplifiers a frequency $f_6$ while the two bands centred of $f_8$ and $f_9$ respectively are used for less measurements. The allocation of pass and stop bands for the filters shown in Fig. 1 then becomes F1, band stop filter, attenuating range $f_2$ to $f_3$ c./s.
F2, low pass filter, cut-off frequency $f_4$ c./s.
F3, high pass filter, cut-off frequency $f_2$ c./s.
F4, bandpass filter, pass range $f_4$ to $f_5$ c./s.

To measure distortion in the Go direction a steady tone of frequency A c./s. together with a pulsed tone of frequency B c./s. is transmitted from the testing station, the frequencies being chosen so that either the (A—B) or (2A—B) combination as desired lies in the frequency range $f_2$ to $f_3$ c./s. Distortion pulses of mean frequency $f_7$ are therefore produced in each amplifier and are returned in time sequence by the filters F2 to the testing station. The filter F1 at the input of each amplifier ensures that only the distortion pulse produced in each individual amplifier is passed through its associated filter F2. Clearly it would be possible to pulse the A tone instead of or in addition to the B tone.

Measurement of the Return direction is made by transmitting test tones from a second testing station at the opposite end of the chain of unattended stations, the test frequencies being such that the (A—B) or (2A—B) combination tone frequency as desired lies in the frequency range $f_1$ to $f_2$ c./s. For this direction the filter F3 eliminates the distortion produced by earlier amplifiers.

The check of the loop loss of each repeater section is made by sending from the two testing stations in turn a single pulsed tone of frequency $f_8$. This test will locate a transmission fault to either a Go amplifier at one station, a Return amplifier in the adjacent station nearer to the testing station or the cable between the two stations. If the test is repeated using pulsed tone of frequency $f_9$, the results of the two tests can be interpreted to locate the fault to one particular amplifier or to the cable section.

It is desirable to shape the transmitted pulse so as to minimise the bandwidth required for distortionless transmission of the pulse. A $\cos^2$ pulse is suitable for this purpose, requiring a bandwidth of $$\frac{2}{T} \text{ c./s.}$$

where T is the half amplitude width in seconds. To obtain the minimum bandwidth the pulse width should be made as long as possible consistent with adequate separation of adjacent returned distortion pulses for the $\cos^2$ pulse; this requires the half-amplitude width to be less than $0.8\times$ the echo time of a repeater section.

The filters F2 and F4 are designed to cause only a low bridging loss when connected across the main signal path so that it is possible to switch the filters into or out of circuit at any repeater station with negligible disturbance to the main signal path by open-circuiting a series element or short-circuiting a shunt element at the electrical centre of the filter. With such switching the filters F2 and F4 can be switched into circuit only at every $n$th amplifier so increasing the echo time $n$ times and permitting an $n$ fold increase of pulse length and an equivalent decrease in testing band width. Alternatively the filters F2 and F4 can be switched into circuit in small groups of consecutive stations such as to permit the pulse repetition frequency being made an integral multiple of the channel spacing. The pulse spectrum will then consist entirely of frequencies which are multiples of the channel spacing and which fall in the gaps between channels so that the pulses can be transmitted over a working system without causing any interference to the traffic channels.

In an alternative method of measuring individually the distortion produced by each amplifier, the filter characteristics are altered somewhat, filter F3 being a band-stop filter of the same characteristics as filter F1 and filter F2 being made a band pass filter with the pass-band in a different position in the frequency spectrum for each repeater station. Any amplifier can then be tested for distortion by adjusting the frequencies A and B c./s. of the two test tones so that the type of distortion product to be measured (e. g. A—B or 2A—B) lies within the pass band of the filter F2 associated with the particular amplifier under test. The filters F1 and F3 have a stop band located within the passband of F2 and so prevent distortion products lying within the pass band of F2 and produced in amplifiers preceding that under test from returning to the measuring point via the amplifier under test.

A further feature of this testing method may be more readily explained with reference to Fig. 3 which shows one possible relationship of the pass and stop bands of the filters F1, F2, F3, F4. When the amplifier is to be tested for distortion, the distortion product to be measured is arranged (by choice of the A and B frequencies) to lie at the frequency $f_6$ which is within the stop band of F1 or F3 and also within the passband of F2 as explained above. The pass band of F2 is wider than the stop band of F1 and F3 but the three filters have a common lower (or upper) cut off frequency. Similarly F2 and F4 have a common cut-off frequency with pass bands lying on opposite sides of the stop band of F1 so that return paths through the station under test back to the testing station will exist for two frequencies $f_5$ and $f_7$. One path includes only the Go amplifier and the second path the Return amplifier so that by making tests with both these frequencies from both end of the chain of stations, a transmission fault can be located to one of the amplifiers at a particular station or to the section of cable between two adjacent stations.

Actually the requirements for the characteristics of the filters are somewhat more flexible and the conditions to be met may be set out as follows:

1. The stop-bands of F1 and F3 are narrower than, and lie wholly or partly within, the pass-band of F2.
2. The pass-bands of F2 and F4 do not overlap.
3. The stop-bands of F1 and F3 may extend partly into the pass-band of F4 as well as lying partly within the pass-band of F2.

By restricting the choice of test tone frequencies to integral multiples (or very near multiples) of the channel spacing of the wide band system, e. g. 4 kc./s., all the test tones and their intermodulation products will lie in the interchannel gaps and interference with the signals on the carrier system will be avoided.

I claim:

1. In a wide-band telecommunication system employing a signalling line connecting two attended repeater stations by way of a plurality of intermediate unattended repeater stations, separate Go and Return conductors being provided for the two directions of transmission with separate amplifiers associated with each conductor in each intermediate station, a testing arrangement comprising in combination a bandpass filter at each intermediate station connected between the respective outputs of the amplifiers for the two directions of transmission, the passbands of said filters being different at the different intermediate stations, a bandstop filter at each intermediate station connected on the input side of the amplifier for the Go direction of transmission, the stop-band of the bandstop filter in any intermediate station falling within the passband of the associated bandpass filter, a first variable frequency alternating current source in one of said attended stations, a second variable frequency alternating current source in said one attended station, means for selectively adjusting the frequencies of said sources so that second order difference tones fall within the pass-bands of the respective bandpass filters and the stop-bands of the associated bandstop filters, means in said one attended station for connecting said sources to said Go conductor and means in said one attended station connected to said Return conductor for analysing the alternating current received back over said Return conductor as a result of the connection of said sources to said Go conductor.

2. In a wide-band telecommunication system employing a signalling line connecting two attended repeater stations by way of a plurality of intermediate unattended repeater stations, separate Go and Return conductors being provided for the two directions of transmission with separate amplifiers associated with each conductor in each intermediate station, a testing arrangement comprising, in combination, a bandpass filter at each intermediate station connected between the respective outputs of the amplifiers for the two directions of transmission, the passbands of said filters being different at the different intermediate stations, a first bandstop filter at each intermediate station connected on the input side of the amplifier for the Go direction of transmission, a second bandstop filter at each intermediate station connected on the input side of the amplifier for the Return direction of transmission, the stop-bands of the bandstop filters in any intermediate station falling within the passbands of the associated bandpass filter, a first variable frequency alternating current source in one of said attended stations, a second variable frequency alternating current source in said one attended station, means for selectively adjusting the frequencies of said sources so that second order difference tones fall within the passbands of the respective bandpass filters and the stop-bands of the associated first bandstop filters, means in said one attended station for connecting said sources to said Go conductor and means in said one attended station connected to said Return conductor for analysing the alternating current received back over said Return conductor as a result of the connection of said sources to said Go conductor.

3. An arrangement as claimed in claim 1, in which the frequencies of the alternating current sources used for testing are substantially integral multiples of the channel spacing so that the second order difference tones occur in the channel gaps.

4. An arrangement as claimed in claim 1, in which control means are provided at said attended station for switching in and out the bandpass filters at any intermediate station by the operation of a contact which open-circuits a series element or short-circuits a shunt element at the electrical centre of the filter.

5. In a wide-band telecommunication system employing a signalling line connecting two attended repeater stations by way of a plurality of intermediate unattended repeater stations, separate Go and Return conductors being provided for the two directions of transmission with separate amplifiers associated with each conductor in each intermediate station, a testing arrangement comprising, in combination, a bandpass filter at each intermediate station connected between the respective outputs of the amplifiers for the two directions of transmission, the passbands of said filters being the same at each intermediate station, a bandstop filter at each intermediate station connected on the input side of the amplifier for the Go direction of transmission the stop-bands of said bandstop filters falling within the passband of said bandpass filters, a first alternating current source in one of said attended stations, a second alternating current source in said one attended station, the frequencies of said sources being so chosen that second order difference tones fall within the passband of said bandpass filters and the stopbands of the bandstop filters, means in said one attended station for connecting said first source to said Go conductor, means in said one attended station for additionally connecting said second source intermittently to said Go conductor and means in said one attended station connected to said Return conductor for separately displaying the alternating current pulses received back over said Return conductor as a result of the connection of said sources to said Go conductor.

6. An arrangement as claimed in claim 5, in which the pulses produced by the intermittent connection of said second source are of the $\cos^2$ type and the duration of individual pulses is such that the half amplitude length is less than 0.8 times the echo time of a repeater section.

7. An arrangement as claimed in claim 6, in which control means provided at said one attended station for switching in and out said bandpass filters serve to effect switching simultaneously at every $n$th repeater where $n$ is a small integer thereby permitting increase of the echo time and hence of the pulse length without any increase of testing band width.

8. An arrangement as claimed in claim 6, in which the pulse frequency is selected to be an integral multiple of the channel spacing whereby all the test products occur in the gaps between channels.

9. In a wide-band telecommunication system employing a signalling line connecting two attended repeater stations by way of a plurality of intermediate unattended repeater stations, separate Go and Return conductors being provided for the two directions of transmission with separate amplifiers associated with each conductor in each intermediate station, a testing arrangement comprising in combination, a bandpass filter at each intermediate station connected between the respective outputs of the amplifiers for the two directions of transmission, the passbands of said filters being different at the different intermediate stations, a first bandstop filter at each intermediate station connected on the input side of the amplifier for one direction of transmission, a second bandstop filter at each intermediate station on the input side of the amplifier for the other direction of transmission, the stopbands of the two bandstop filters in any intermediate station being different but both falling within the passband of the associated bandpass filter, a first variable frequency alternating current source in one of said attended stations, a second variable frequency alternating current source in said one attended station, means for selectively adjusting the frequencies of said first and second sources so that second order difference tones fall within the passbands of the respective bandpass filters and the stopbands of the associated first bandstop filters, means in said one attended station for connecting said sources to one of said conductors, means in said one attended station connected to the other of said conductors for analysing the alternating current received back over said other conductor as a result of the connection of said sources to said one conductor, a third variable frequency alternating current source in said other attended station, a fourth variable frequency alternating current source in said other attended station, means for selectively adjusting the frequencies of said third and fourth sources so that second order difference tones fall within the passbands of the respective bandpass filters and the stopbands of the associated second bandstop filters, means in said other attended station for connecting said third and fourth sources to the other of said conductors and means in said other attended station connected to said one conductor for analysing the alternating current received back over said one conductor as a result of the connection of said third and fourth sources to said other conductor.

10. In a wide-band telecommunication system employing a signalling line connecting two attended repeater stations by way of a plurality of intermediate unattended repeater stations, separate Go and Return conductors being provided for the two directions of transmission with separate amplifiers associated with each conductor in each intermediate station, a testing arrangement comprising in combination, a first bandpass filter at each intermediate station connected between the respective outputs of the amplifiers for the two directions of transmission, the passbands of said filters being different at the different intermediate stations, a second bandpass filter at each intermediate station connected between the respective inputs of the amplifiers for the two directions of transmission, the passbands of said second bandpass filters being different at the different intermediate stations and the passbands of the two bandpass filters in each intermediate station being arranged not to overlap, a first bandstop filter at each intermediate station connected on the input side of the amplifier for the Go direction of transmission, a second bandstop filter at each intermediate station connected on the input side of the amplifier for the Return direction of transmission, the stopbands of the filters in any intermediate station falling within the passband of the associated first bandpass filter, a first variable frequency alternating current source in one of said attended stations, a second variable frequency alternating current source in said one attended station, means for selectively adjusting the frequencies of said sources so that second order difference tones fall within the passbands of said first bandpass filters but outside the passbands of said second bandpass filters, means in said one attended station for connecting said sources to said Go conductor and means in said one attended station connected to said Return conductor for analysing the alternating current received back over said Return conductor as a result of the connection of said sources to said Go conductor.

11. In a wide-band telecommunication system employing a signalling line connecting two attended repeater stations by way of a plurality of intermediate unattended repeater stations, separate Go and Return conductors being provided for the two directions of transmission with separate amplifiers associated with each conductor in each intermediate station, a testing arrangement comprising in combination a bandpass filter at each intermediate station connected between the respective outputs of the amplifiers for the two directions of transmission, the passbands of said filters being different at the different intermediate stations, a bandstop filter at each intermediate station connected on the input side of the amplifier for the Go direction of transmission, the stopband of the bandstop filter in any intermediate station falling within the passband of the associated bandpass filter, a first variable frequency alternating current source in one of said attended stations, a second variable frequency alternating current source in said one attended station, means for selectively adjusting the frequencies of said sources so that third order difference tones fall within the pass-bands of the respective bandpass filters and the stop-bands of the associated bandstop filters, means in said one attended station for connecting said sources to said Go conductor and means in said one attended station connected to said Return conductor for analysing the alternating current received back over said Return conductor as a result of the connection of said sources to said Go conductor.

12. In a wide-band telecommunication system employing a signalling line connecting two attended repeater stations by way of a plurality of intermediate unattended repeater stations, separate Go and Return conductors being provided for the two directions of transmission with separate amplifiers associated with each conductor in each intermediate station, a testing arrangement comprising, in combination, a bandpass filter at each intermediate station connected between the respective outputs of the amplifiers for the two directions of transmission, the passbands of said filters being different at the different intermediate stations, a first bandstop filter at each intermediate station connected on the input side of the amplifier for the Go direction of transmission, a second bandstop filter at each intermediate station connected on the input side of the amplifier for the Return direction of transmission, the stopbands of the bandstop filters in any intermediate station falling within the passbands of the associated bandpass filter, a first variable frequency alternating current source in one of said attended stations, a second variable frequency alternating current source in said one attended station, means for selectively adjusting the frequencies of said sources so that third order difference tones fall within the passbands of the respective bandpass filters and the stopbands of the associated first bandstop filters, means in said one attended station for connecting said sources to said Go conductor and means in said one attended station connected to said Return conductor for analysing the alternating current received back over said Return conductor as a result of the connection of said sources to said Go conductor.

13. In a wide-band telecommunication system employing a signalling line connecting two attended repeater stations by way of a plurality of intermediate unattended repeater stations, separate Go and Return conductors being provided for the two directions of transmission with separate amplifiers associated with each conductor in each intermediate station, a testing arrangement comprising, in combination, a bandpass filter at each intermediate station connected between the respective outputs of the amplifiers for the two directions of transmission, the passbands of said filters being the same at each intermediate station, a bandstop filter at each intermediate station connected on the input side of the amplifier for the Go direction of transmission the stopbands of said bandstop filters falling within the passband of said bandpass filters, a first alternating current source in one of said attended stations, a second alternating current source in said one attended station, the frequencies of said sources being so chosen that third order difference tones fall within the pass band of said bandpass filters and the stopbands of the bandstop filters, means in said one attended station for connecting said first source to said Go conductor, means in said one attended station for additionally connecting said second source intermittently to said Go conductor and means in said one attended station connected to said Return conductor for separately displaying the alternating current pulses received back over said Return conductor as a result of the connection of said sources to said Go conductor.

14. In a wide-band telecommunication system employing a signalling line connecting two attended repeater stations by way of a plurality of intermediate unattended repeater stations, separate Go and Return conductors being provided for the two directions of transmission with separate amplifiers associated with each conductor in each intermediate station, a testing arrangement comprising in combination, a bandpass filter at each intermediate station connected between the respective outputs of the amplifiers for the two directions of transmission, the passbands of said filters being different at the different intermediate stations, a first bandstop filter at each intermediate station connected on the input side of the amplifier for one direction of transmission, a second bandstop filter at each intermediate station on the input side of the amplifier for the other direction of transmission, the stopbands of the two bandstop filters in any intermediate station being different but both falling within the passband of the associated bandpass filter, a first variable frequency alternating current source in one of said attended stations, a second variable frequency alternating current source in said one attended station, means for selectively adjusting the frequencies of said first and second sources so that third order difference tones fall within the passbands of the respective bandpass filters and the stopbands of the associated first bandstop filters, means in said one attended station for connecting said sources to one of said conductors, means in said one attended station connected to the other of said conductors for analysing the alternating current received back over said other conductor as a result of the connection of said sources to said one conductor, a third variable frequency alternating current source in said other attended station, a fourth variable frequency alternating current source in said other attended station, means for selectively adjusting the frequencies of said third and fourth sources so that third order difference tones fall within the passbands of the respective bandpass filters and the stopbands of the associated second bandstop filters, means in said other attended station for connecting said third and fourth sources to the other of said conductors and means in said other attended station connected to said one conductor for analysing the alternating current received back over said one conductor as a result of the connection of said third and fourth sources to said other conductor.

15. In a wide-band telecommunication system employing a signalling line connecting two attended repeater stations by way of a plurality of intermediate unattended repeater stations, separate Go and Return conductors being provided for the two directions of transmission with separate amplifiers associated with each conductor in each intermediate station, a testing arrangement comprising in combination, a first bandpass filter at each intermediate station connected between the respective outputs of the amplifiers for the two directions of transmission, the passbands of said filters being different at the different intermediate stations, a second bandpass filter at each intermediate station connected between the respective inputs of the amplifiers for the two directions of transmission, the passbands of said second bandpass filter being different at the different intermediate stations and the passbands of the two bandpass filters in each intermediate station being arranged not to overlap, a first bandstop filter at each intermediate station connected on the input side of the amplifier for the Go direction of transmission, a second bandstop filter at each intermediate station connected on the input side of the amplifier for the Return direction of transmission, the stopbands of the filters in any intermediate station falling within the passband of the associated first bandpass filter, a first variable frequency alternating current source in one of said attended stations, a second variable frequency alternating current source in said one attended station, means for selectively adjusting the frequencies of said sources so that third order difference tones fall within the passband of said first bandpass filters but outside the passbands of said second bandpass filter, means in said one attended station for connecting said sources to said Go conductor and means in said one attended station connected to said Return conductor for analysing the alternating current received back over said Return conductor as a result of the connection of said sources to said Go conductor.

16. In a wide-band telecommunication system employing a signalling line connecting two attended repeater stations by way of a plurality of intermediate unattended repeater stations, separate Go and Return conductors being provided for the two directions of transmission with separate amplifiers associated with each conductor in each intermediate station, a testing arrangement comprising in combination a bandpass filter at each intermediate station connected between the respective outputs of the amplifiers for the two directions of transmission, the passbands of said filters being different at the different intermediate stations, a bandstop filter at each intermediate station connected on the input side of the amplifier for the Go direction of transmission, the stop-band of the bandstop filter in any intermediate station falling within the passband of the associated bandpass filter, a first variable frequency alternating current source in one of said attended stations, a second variable frequency alternating current source in said one attended station, means for selectively adjusting the frequencies of said sources so that low order combination tones fall within the pass-bands of the respective bandpass filters and the stop-bands of the associated bandstop filters, means in said one attended station for connecting said sources to said Go conductor and means in said one attended station connected to said Return conductor for analysing the alternating current received back over said Return conductor as a result of the connection of said sources to said Go conductor.

References Cited in the file of this patent

UNITED STATES PATENTS

| Number | Name | Date |
| --- | --- | --- |
| 2,208,417 | Gilbert | July 16, 1940 |
| 2,315,435 | Leibe | Mar. 30, 1943 |
| 2,337,541 | Burgess | Dec. 28, 1943 |
| 2,550,782 | Cooper et al. | May 1, 1951 |
| 2,611,041 | Cooper | Sept. 16, 1952 |